US012660829B2

(12) United States Patent
Chappell

(10) Patent No.: US 12,660,829 B2
(45) Date of Patent: Jun. 23, 2026

(54) SWEEP EDGE BLADES FOR LOIN PULLER MACHINE

(71) Applicant: Hall Fabrication, Inc., Henderson, NV (US)

(72) Inventor: David Chappell, Las Vegas, NV (US)

(73) Assignee: Hall Fabrication, Inc., Henderson, NV (US)

( * ) Notice: Subject to any disclaimer, the term of this patent is extended or adjusted under 35 U.S.C. 154(b) by 84 days.

(21) Appl. No.: 18/416,535

(22) Filed: Jan. 18, 2024

(65) Prior Publication Data

US 2025/0234872 A1 Jul. 24, 2025

(51) Int. Cl.
| | |
|---|---|
| *A22B 5/00* | (2006.01) |
| *A22C 17/00* | (2006.01) |
| *A22C 17/02* | (2006.01) |
| *B65G 17/06* | (2006.01) |

(52) U.S. Cl.
CPC ........ *A22B 5/0094* (2013.01); *A22C 17/0033* (2013.01); *A22C 17/0093* (2013.01); *A22C 17/02* (2013.01); *B65G 17/06* (2013.01); *B65G 2201/0202* (2013.01)

(58) Field of Classification Search
CPC . A22B 5/0094; A22C 17/0046; A22C 21/022; B25J 11/0045
USPC ........................................................ 452/171
See application file for complete search history.

(56) References Cited

U.S. PATENT DOCUMENTS

| | | | |
|---|---|---|---|
| 5,234,371 A | 8/1993 | Andre et al. | |
| 5,295,898 A | 3/1994 | Andre et al. | |
| 5,407,384 A | 4/1995 | Boody et al. | |
| 5,882,252 A | 3/1999 | Boody et al. | |
| 6,089,968 A | 7/2000 | Andre et al. | |
| 6,547,658 B2 | 4/2003 | Boody et al. | |
| 7,118,471 B2 | 10/2006 | Chappell et al. | |
| 7,226,350 B1 * | 6/2007 | Chappell ............ | A22C 17/0046 |
| | | | 452/171 |
| 7,354,339 B2 | 4/2008 | Chappell et al. | |
| 9,247,755 B1 * | 2/2016 | Andre .................. | A22B 5/0029 |
| 2002/0019208 A1 * | 2/2002 | Boody ............... | A22C 17/0046 |
| | | | 452/171 |
| 2007/0184767 A1 * | 8/2007 | Roy ................... | A22C 17/0046 |
| | | | 452/171 |

* cited by examiner

*Primary Examiner* — Richard T Price, Jr.
(74) *Attorney, Agent, or Firm* — McKee, Voorhees & Sease, PLC

(57) ABSTRACT

A knife blade for a loin puller machine to cut pork carcasses includes an elongated member with opposite upper and lower mounting ends to mount the blade to the machine. The mounting ends are offset with respect to one another, with a cutting edge extending angularly between the opposite mounting ends. Angular orientation of the cutting edge causes the cutting edge to enter the meat sequentially between the opposite ends of the cutting edge, thereby providing a cleaner cut with improved yield and less blade wear when the carcass is not firm.

19 Claims, 16 Drawing Sheets

20

20

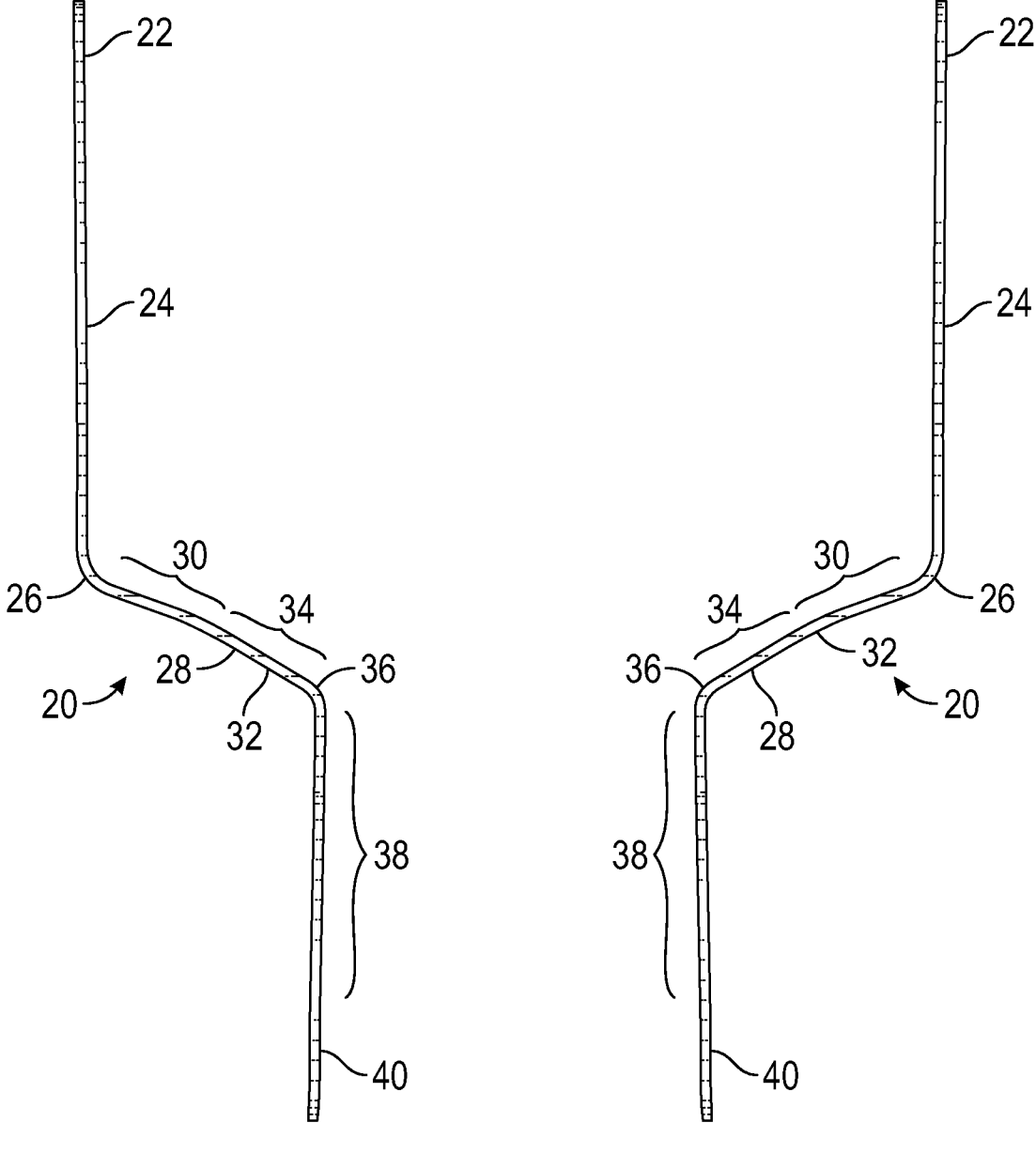
FIG. 6                    FIG. 7

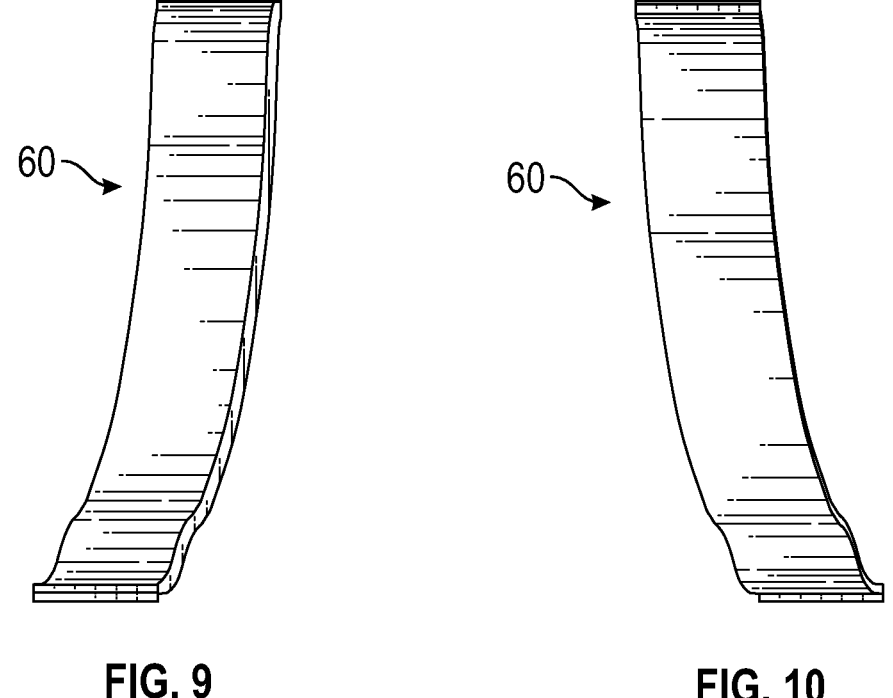
FIG. 9                    FIG. 10

92

90

96

94

90

96

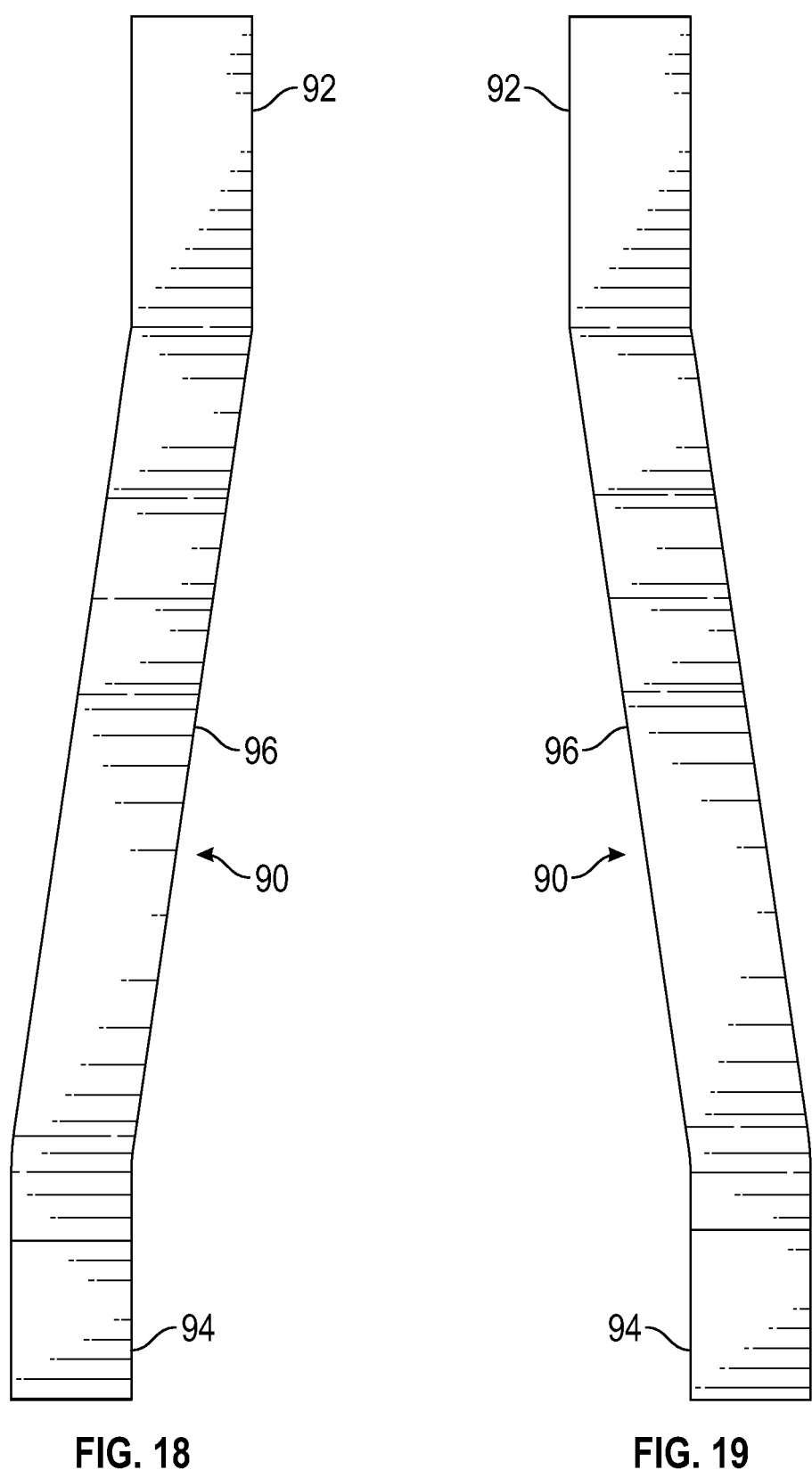
FIG. 18           FIG. 19

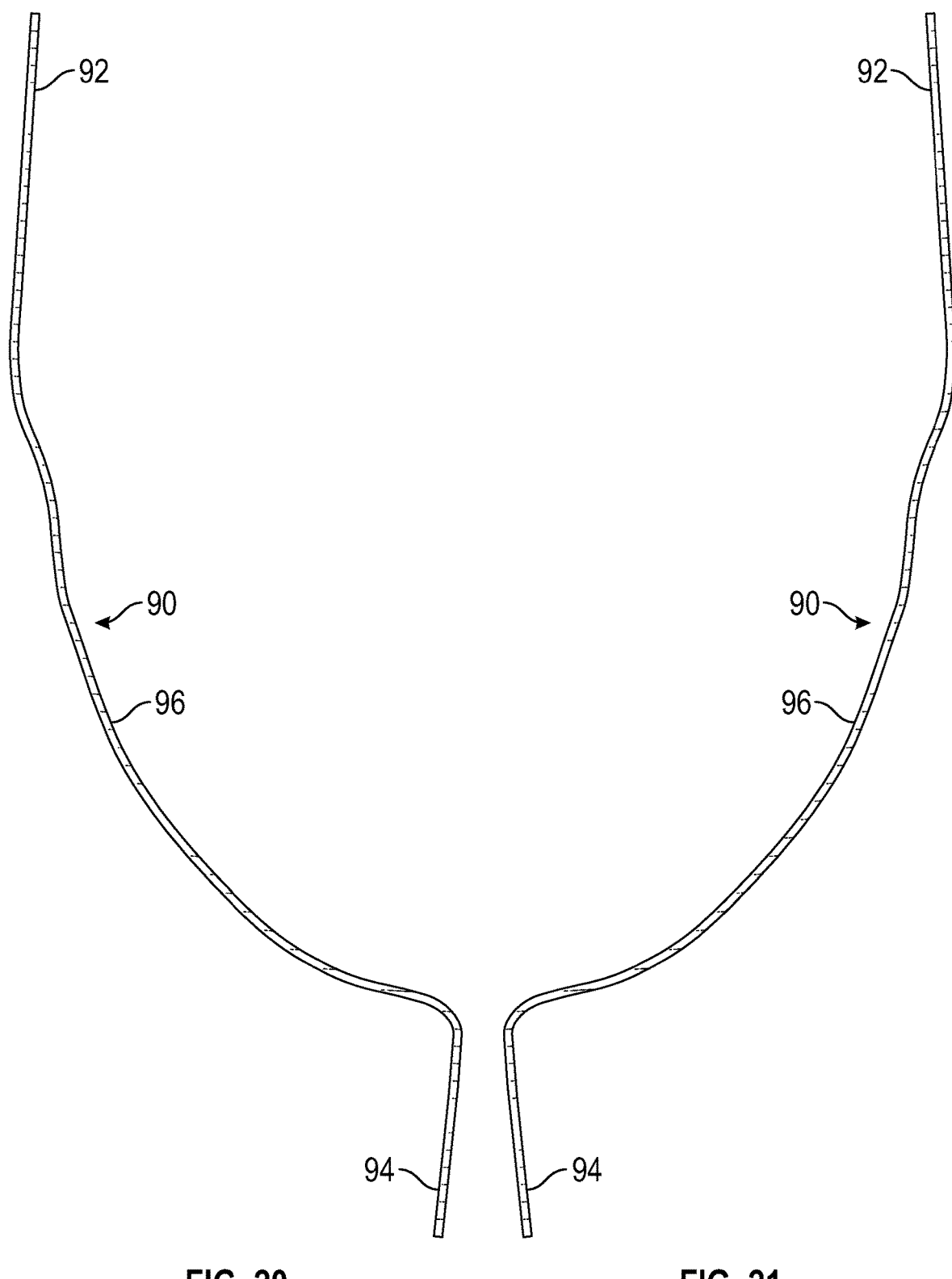
FIG. 20                                 FIG. 21

SWEEP EDGE BLADES FOR LOIN PULLER MACHINE

TECHNICAL FIELD

The invention relates to knife blades used on a loin puller machine to separate a loin portion from the belly and fatback portions of a pork carcass.

BACKGROUND

Automatic loin pulling machines carry pork carcasses past a number of blades to remove the loin portion from the belly and fatback portions. The blades include a J-shaped blade, a Z-shaped blade, a trim blade, and a U-shaped hoop blade, The Z-blade separates the loin portion from the belly portion of a hog carcass and leaves a "belly shelf" and fingers of lean meat on the belly of a hog. The J-blade cuts from the chine or backbone side of the carcass to separate the fatback portion from the loin portion. FIG. 22 illustrates the orientation of the Z and J-blades and a hog carcass. Each blade has opposite ends for mounting to the machine and a knife edge for cutting the meat. The full length of knife edge of each type of blade enters the meat upon initial contact between the blade and the carcass. In preferred operating conditions, the meat is at a consistency that is firm as opposed to leaner meat which can be more pliable. When the carcass is relatively firm the knife edge cuts cleanly into the meat.

When the pork carcass is leaner, the meat does not stiffen as much during cooling, and the knife edge does not cut cleanly into the meat. Rather, the meat tends to buckle when the meat hits the full length of the blade edge all at once. This leads to loss of yield and consistency. The softer, pliable meat also increases the force on the blade, leading to premature wear. As the meat moves past the blade, there is cutting drag which increases wear on the blade components as well as the blade mounting components. Worn blades and components must be replaced in a timely manner to avoid yield losses, broken carcass bones, and improper meat cutting. Thus, the blades have a shorter useful life when the meat is soft.

Carcasses also tend to be firmer when they are colder.

Therefore, there is a need in the industry for improved cutting blades for use with leaner pork carcasses.

Accordingly, a primary objective of the present invention is the provision of improved cutting blades which can be used with leaner pork carcasses which causes the meat to be soft or pliable.

Another objective of the present invention is the provision of improved cutting blades for loin puller machines which can be used on soft and/or pliable meat.

Still another objective of the present invention is the provision of improved loin puller machine blades having a sweeping cutting edge so as to gradually cut into the meat as the meat is conveyed through the machine.

Yet another objective of the present invention is the provision of an improved Z-blade, the blade, and trim blade, for a loin puller machine which have angled cutting edges so as to gradually cut into the carcass as the carcass is conveyed past each blade.

Still another objective of the present invention is the provision of improved cutting blades for a loin puller machine which maximizes yield and consistency of loins cut from the carcasses.

These and other objectives will become apparent from the following description of the invention.

SUMMARY

The J-blade, Z-blade, and trim blade of a loin puller machine are each formed with opposite mounting ends and a sweeping cutting edge. The sweeping edge of each blade is angled or sloped between the opposite mounting ends which are offset with respect to one another. The angled cutting edge of each blade gradually enters the meat product as the carcass moves along the machine and past the blades. These angled cutting edges produce a clean cut, even when the meat product is at a relatively lean wherein the meat is soft and/or pliable, so as to increase yield and consistency of the loins cut by the blades. The swept or angled cutting edges also reduce force or stress on the blade, thereby enhancing the life of the blade and minimizing downtime of the carcass cutting process for blade replacement.

BRIEF DESCRIPTION OF THE DRAWINGS

FIG. 6 is a front elevation view of the Z-blade shown in FIG. 1.

FIG. 7 is a rear elevation view of the Z-blade shown in FIG. 1.

FIG. 9 is a top plan view of the J-blade shown in FIG. 7.

FIG. 10 is a bottom plan view of the J-blade shown in FIG. 7.

FIG. 18 is a left side elevation view of the trim blade shown in FIG. 14.

FIG. 19 is a right side elevation view of the trim blade shown in FIG. 14.

FIG. 20 is a front elevation view of the trim blade shown in FIG. 14.

FIG. 21 is a rear elevation of the trim blade shown in FIG. 14.

DETAILED DESCRIPTION

Figure 1:
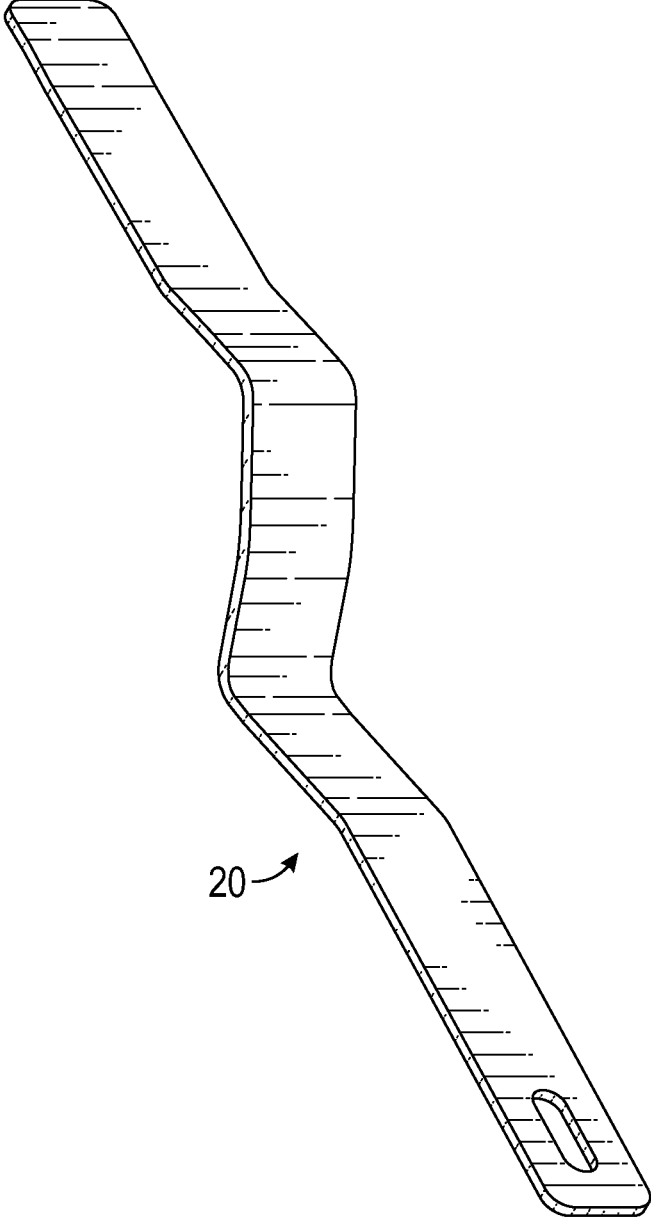
FIG. 1 is a perspective view of a Z-blade for a loin pulling machine, according to the present invention.

A loin pulling machine 10 includes multiple blades for cutting a carcass to produce edible portions for sale. The carcass 12 includes a shoulder portion 18 and a loin portion 16. The carcass moves along a conveyor bed 18 which pulls the carcass 12 through the blades to cut the desired portions.

Figure 2:
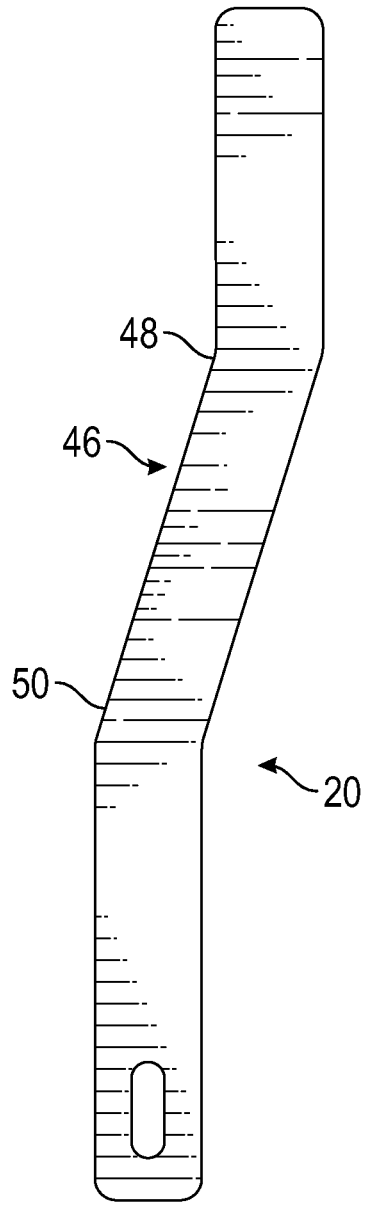
FIG. 2 is a top plan view of the Z-blade shown in FIG. 1.
Figure 3:
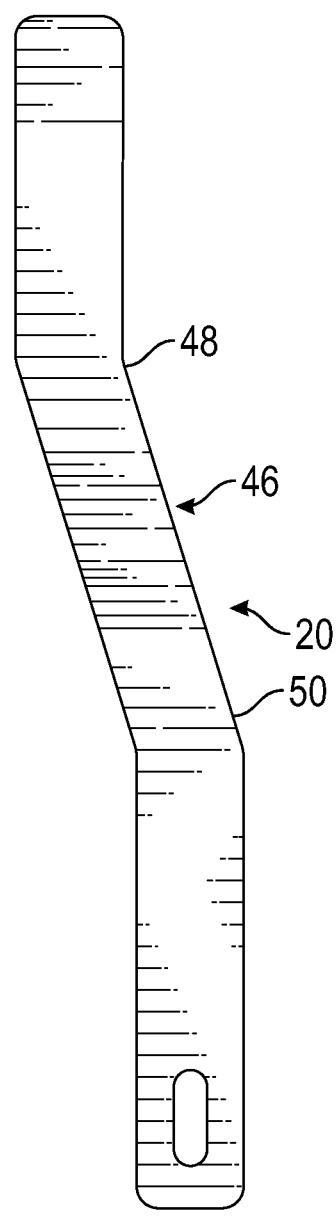
FIG. 3 is a bottom plan view of the Z-blade shown in FIG. 1.
Figure 4:
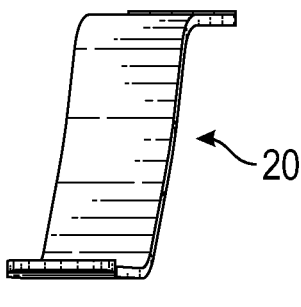
FIG. 4 is a left side elevation view of the Z-blade shown in FIG. 1.
Figure 5:
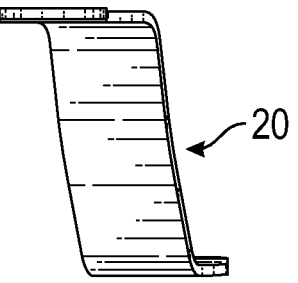
FIG. 5 is on right side elevation view of the Z-blade shown in FIG. 1.
Figure 8:
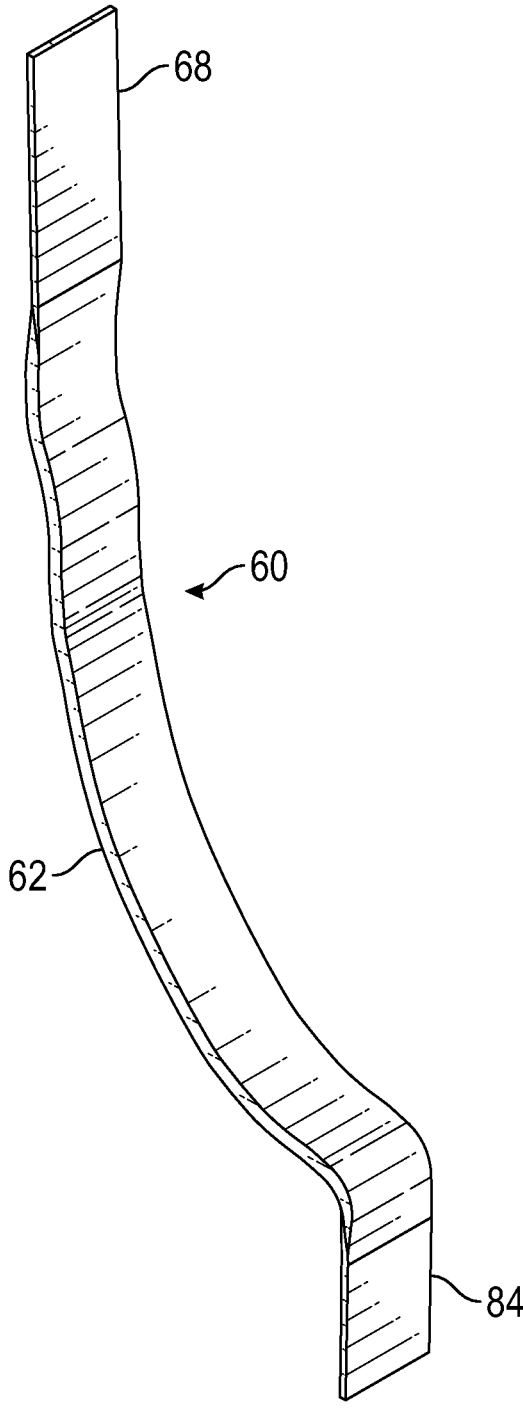
FIG. 8 is a perspective view of the J-blade for use on a loin pulling machine, according to the present invention.
Figures 11, 12:
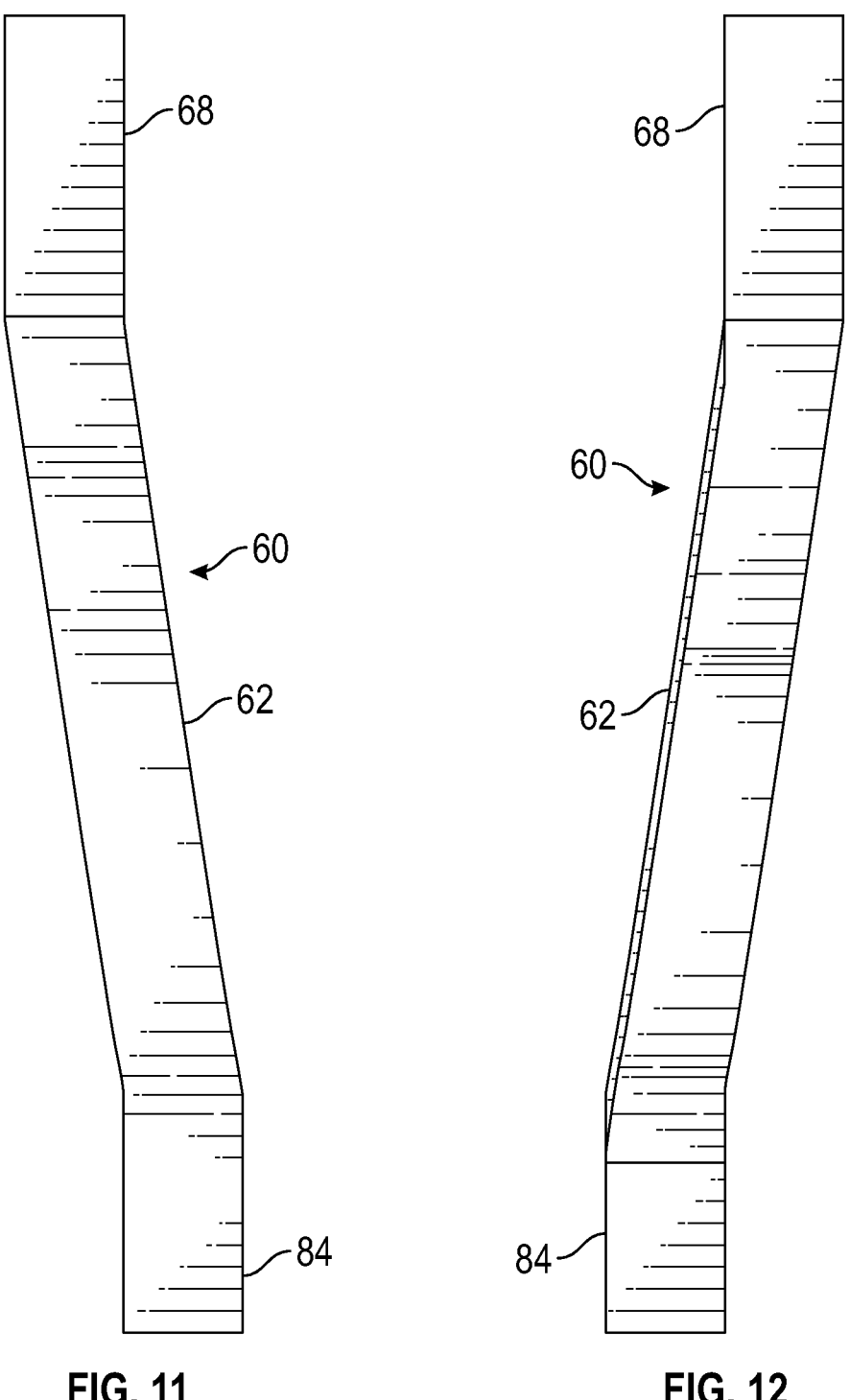
FIG. 11 is a left side elevation view of the J-blade shown in FIG. 7.
FIG. 12 is a right side elevation view of the J-blade shown in FIG. 7.
Figures 13, 14:
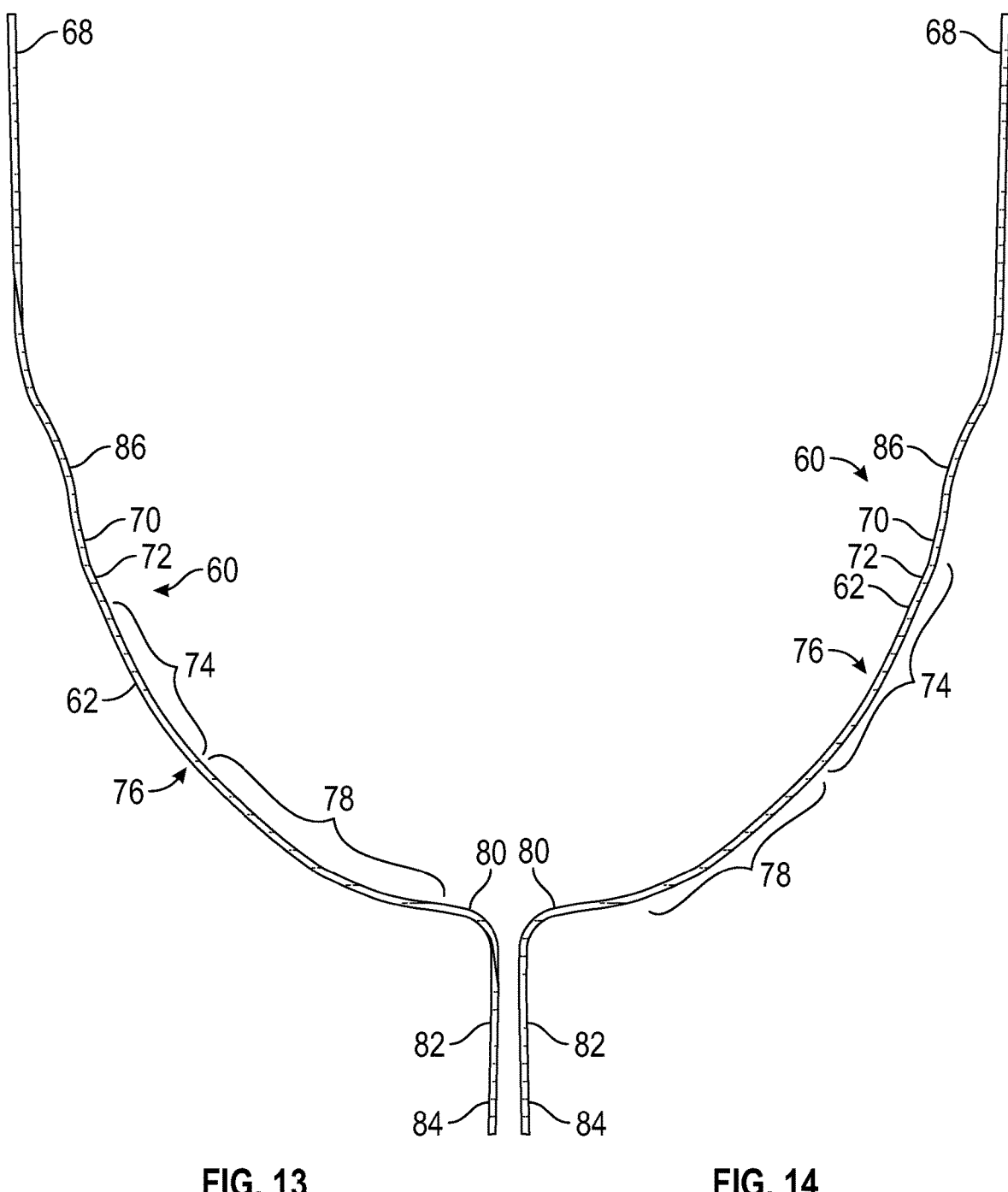
FIG. 13 is a front elevation view of the J-blade shown in FIG. 7.
FIG. 14 is a rear elevation view of the J-blade shown in FIG. 7.
Figure 15:
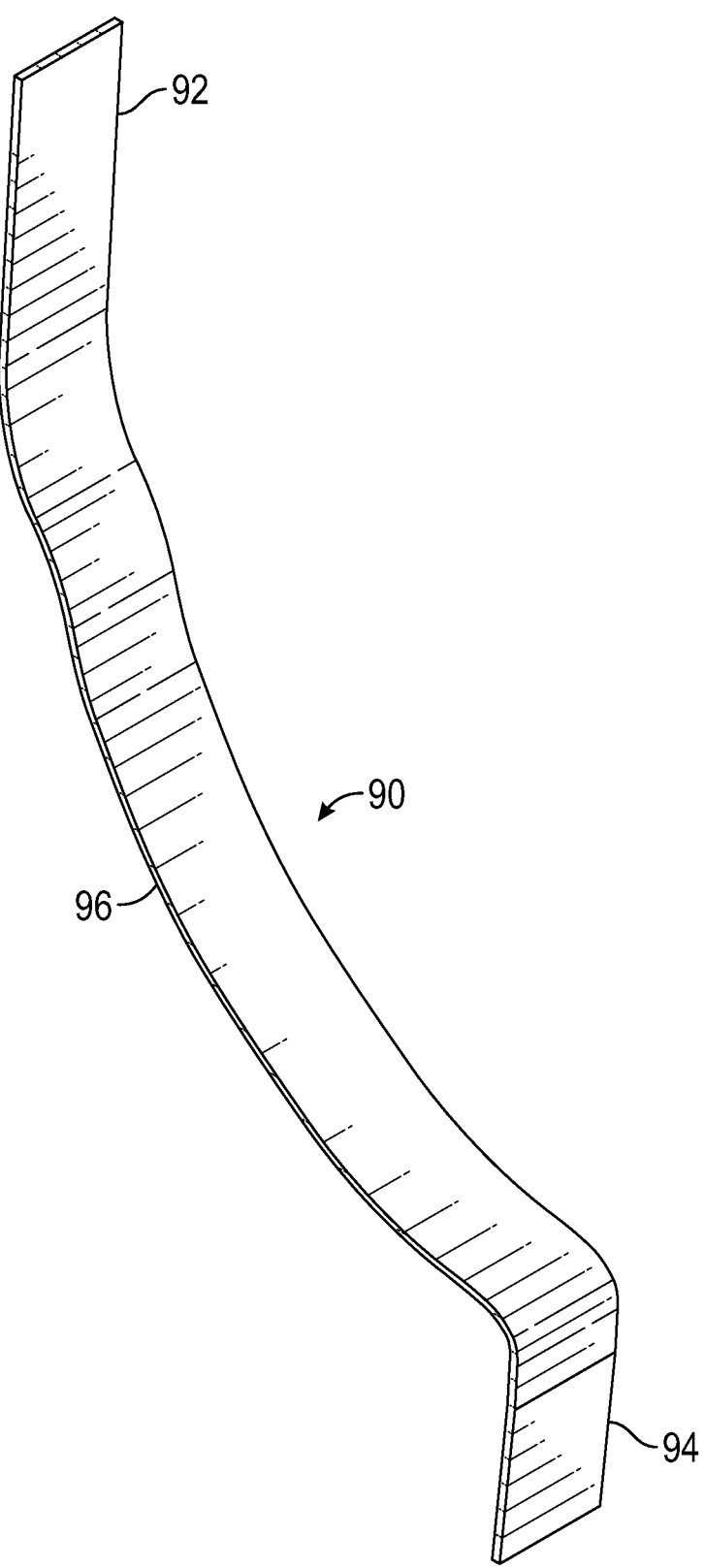
FIG. 15 is a perspective view of a trim blade for use on a loin puller machine, according to the present invention.
Figure 16:
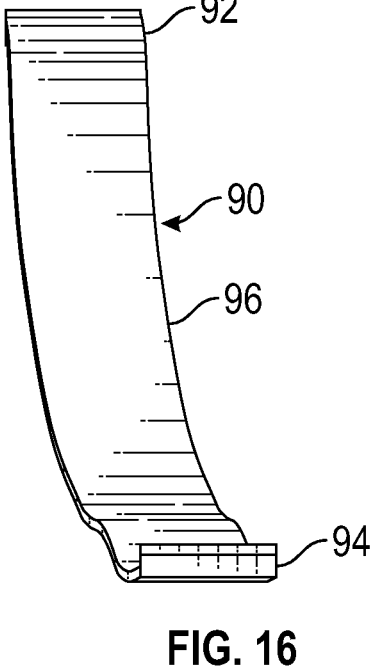
FIG. 16 is a top plan view of the trim blade shown in FIG. 14.
Figure 17:
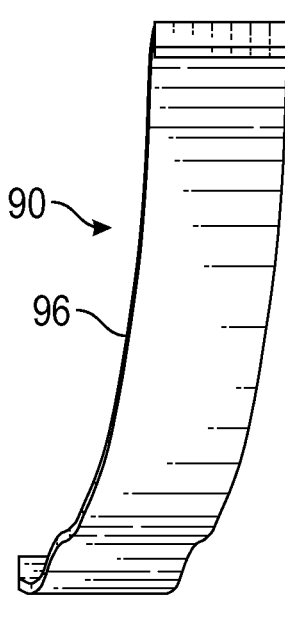
FIG. 17 is a bottom plan view of the trim blade shown in FIG. 14.
Figure 22:
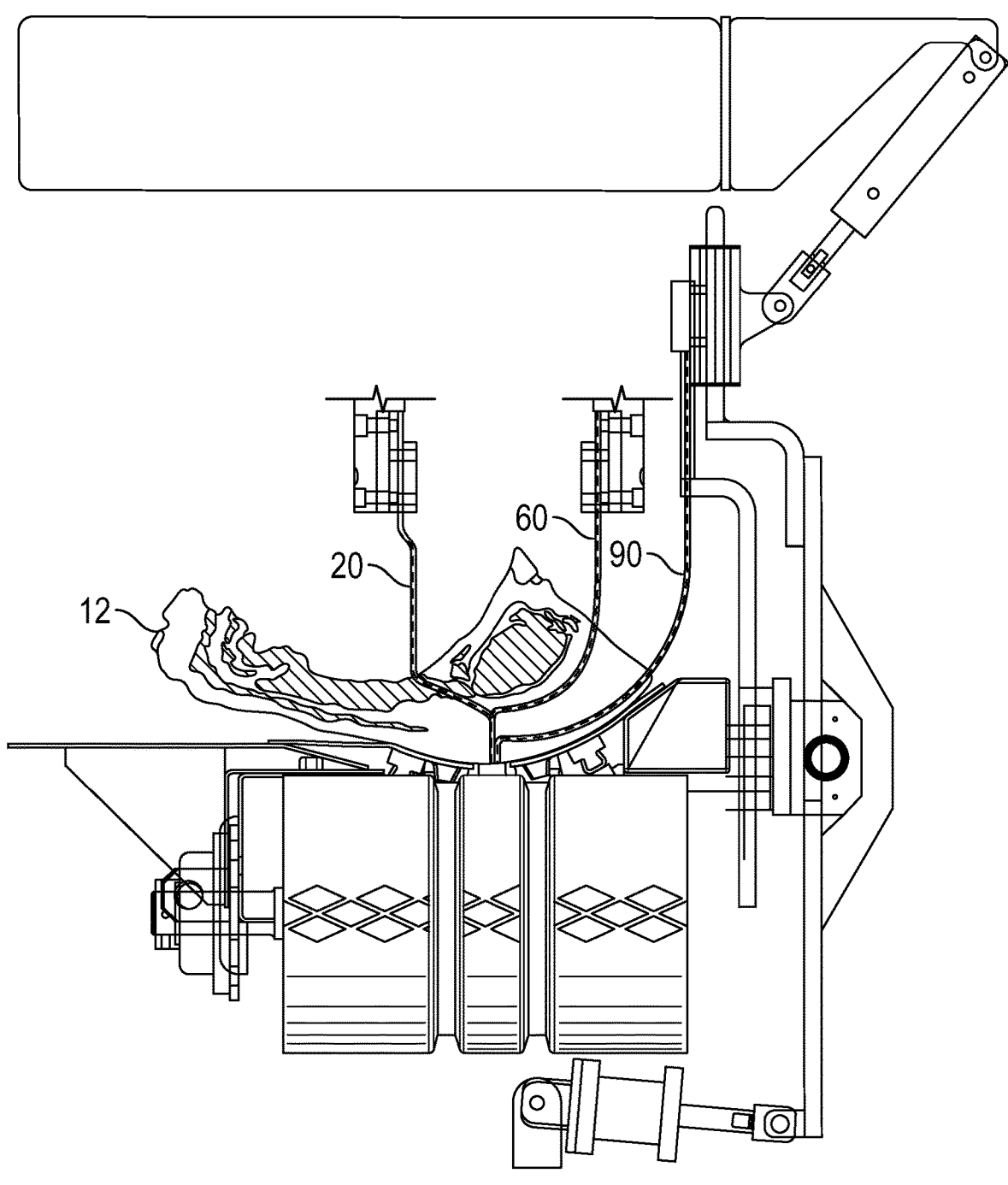
FIG. 22 is a sectional view showing the orientation of a Z blade and trim blade and the carcass on a loin pulling machine.

The Z-blade of this invention is designated by the reference numeral 20 in FIGS. 1-7. The Z-blade 20 includes a mounting portion 22, and upper central blade portion 24, a rib bone radius portion 26, a shelf portion 28 having an upper finger shelf portion 30, a shelf bend portion 32, a lower shelf portion 34, a belly cut off radius 36, a belly cut off blade portion 38, and a lower mount portion 40. The upper and lower mount portions 22 and 40 mount the Z-blade 20 to the loin puller machine 10. The general function of the Z-blade is described in Applicant's U.S. Pat. No. 7,118,471, which is incorporated herein by reference. In comparison to the straight Z-blade shown in FIG. 5 of U.S. Pat. No. 7,118,471, the Z-blade 20 of the present invention has an angular profile, as seen in FIGS. 2 and 3. The upper and lower mount portions 22, 40 in FIGS. 2 and 3 are laterally offset with respect to one another, with the blade edge 6 extends angularly between the upper and lower mount portions 22, 40. The cutting edge 46 has an upper end point 48 and lower end point 50. The length of the cutting edge 46, and thus the location of the upper and lower endpoints 48, 50, may vary, depending on the loin pulling machine 10 and the size of the carcass 12 processed. The cutting edge 46 may be either a single bevel and/or a double bevel edge.

The J-blade 60 of this invention is shown in FIGS. 8-14. The J-blade 60 includes a cutting edge 62, which may be either a single bevel or double bevel edge. The J-blade 60 further includes an upper mount portion 68, an upper central blade portion 70, a rib bone radius portion 72, a lower central blade portion with a flat back trimming portion 74, a transition area 76, a sweeping radius portion 78, a cut off angle bend 80, a cut off portion 82, and a lower leg mount portion 84. The upper and lower mount portion 68, 84 mount the J-blade 62 to the loin polling machine 10. The general function of the J-blade 60 is described in Applicant's U.S. Pat. No. 7,118,471, which is incorporated herein by reference. As compared to the straight profile J blade of the U.S. Pat. No. 7,118,471, the J-blade 60 of the current invention has an angular profile, with the upper and lower mount portions 68, 84 being laterally offset with respect to one another, and the cutting edge 62 extending angularly between the upper and lower mount portions 68, 84.

The trim blade 90 of the present invention is essentially a mirror image of the J-blade 60. The trim blade 90 includes an upper mount portion 92 and a lower mount portion 94 which mount the trim blade 90 to the machine 10. The upper and lower mount portions 92, 94 are laterally offset in respect to one another, with a cutting edge 96 extending angularly between the upper and lower mount portions 92, 94.

In each of the Z, J and trim blades, the upper and lower mounting portions have parallel and offset longitudinal axes, with the axis of the respective cutting edge of each blade extending angularly between the upper and lower mount portions. In each of the Z-blade 20, J-blade 60, and trim blade 90, the angular or sweeping configuration of the cutting edges 46, 62, 96 respectively, allows the blade to gradually enter the carcass 12 from the upper end of the cutting edge to a lower end of the cutting edge, rather than the full length of the cutting edge entering the carcass 12, as in the blades of Applicant's U.S. Pat. No. 7,118,471. This sequential or serial entrance of the cutting edges into the meat provides a clean cut when the meat is soft or pliable. Because the cutting edges 46, 62, 96 of the Z-blade 20, J-blade 60, and trim blade 90 do not enter the meat all at once, the meat does not buckle, as the cutting edge gradually slices into the meat. By providing a clean cut, more accurate cutting is achieved with improved yield and less stress on the blade, thereby extending the life of each blade and reducing the time requirements for replacement of worn blades.

Figure 23:
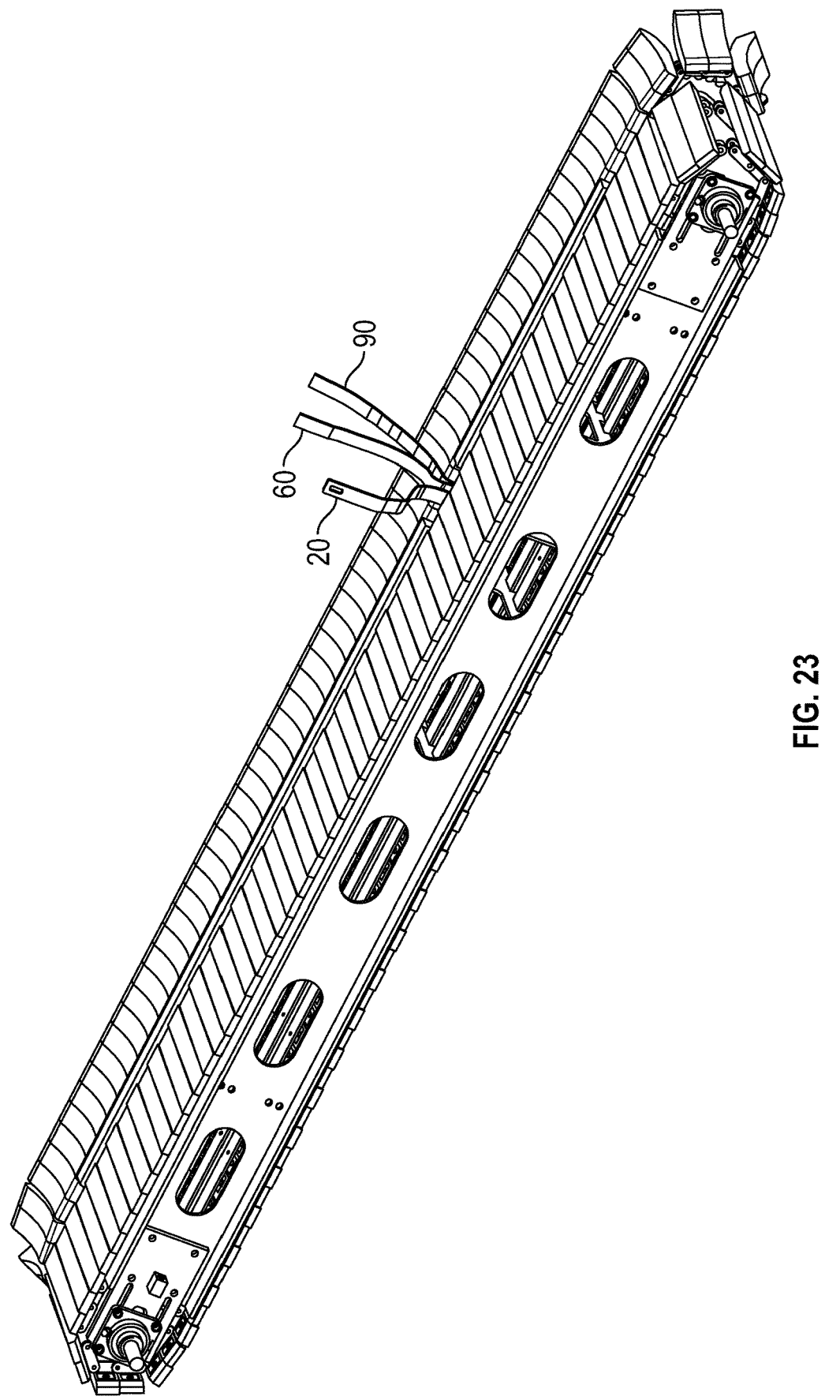
FIG. 23 is a perspective view of a conveyor with the J, Z, and trim blades for a loin pulling machine.
Figure 24:
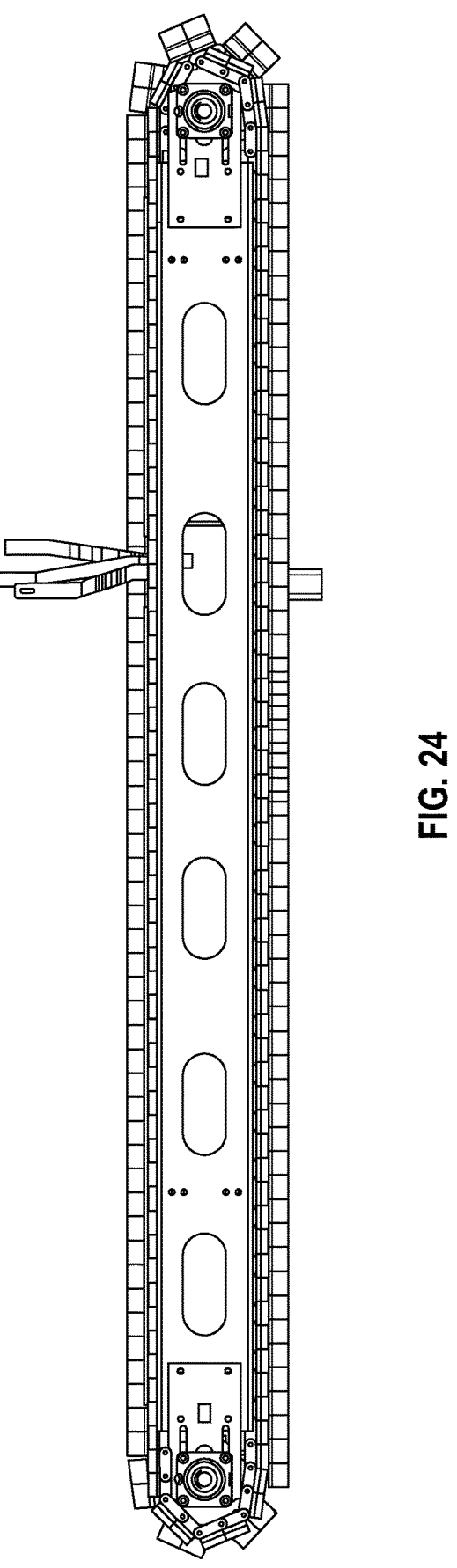
FIG. 24 is a side elevation view of the conveyor and blades shown in FIG. 23.
Figure 25:
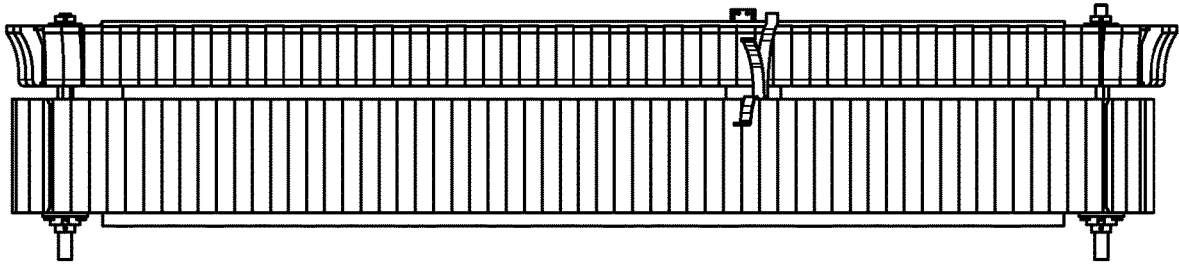
FIG. 25 is a top plan view of the conveyor and blades shown in FIG. 23.
Figure 26:
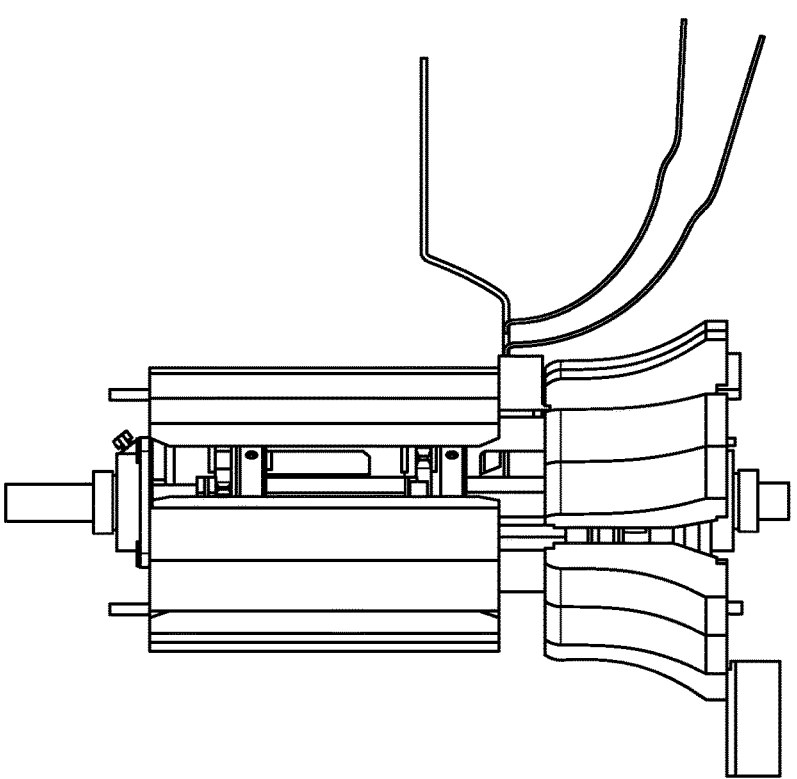
FIG. 26 is an end elevation view of the conveyor and blades shown in FIG. 23.

FIG. 23 shows a slat conveyor assembly for a loin pulling machine, as described in Applicant's co-pending application Ser. No. 18/414,090 filed contemporaneously herewith. FIGS. 23-26 also show the Z blade 20 and the J blade 60 and the sloped orientation of their respective cutting edges relative to the direction of travel (shown by the arrow in FIG. 23) for the carcass. For clarity, the trim blade 90 is not shown in FIG. 23, but is similarly mounted so as to have a sloped cutting edge. In FIG. 23, the cutting edges slope forwardly from bottom to top. It is understood that the blades can be oriented so that their cutting edges slope rearwardly from bottom to top, opposite the arrangement shown in FIG. 23. In either the forward or rearward sloping orientation, the cutting edges of the blades will gradually enter the carcass, to facilitate cutting when the carcass is relatively soft and/or pliable. Thus, the central or primary portions of the cutting edges of the Z, J and trim blades are not vertically oriented.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A knife blade for a loin puller machine having a conveyor for carrying a loin in a longitudinal direction, comprising:

an elongated member having portions along its length, including:

an upper mount portion adapted to mount to the machine;

a lower mount portion adapted to mount to the machine;

the upper and lower mount portions being longitudinally offset from one another relative to a direction of travel of the conveyor;

a cutting edge between the upper and lower mount portions of the member; and the cutting edge being longitudinally angularly disposed between the upper mount portion and the lower mount portion.

2. The knife blade of claim 1 wherein the cutting edge has opposite first and second ends which are adapted to enter a meat carcass sequentially.

3. The knife blade of claim 1 wherein the upper mount portion has a first longitudinal axis, the lower central portion has a second longitudinal axis, and the cuffing edge has a third longitudinal axis, and the first and second longitudinal axes being parallel and offset to one another.

4. The knife blade of claim 3 wherein the third longitudinal axis is angularly disposed to the first and second longitudinal axes.

5. The knife blade of claim 1 wherein the member is a Z blade.

6. The blade of claim 5 further comprising a shelf portion and a belly cut portion.

7. The knife blade of claim 1 wherein the member is a J blade.

8. The knife blade of claim 7 further comprising a straight fatback trimming portion and a sweeping radius portion.

9. A loin puller machine, comprising:

a conveyor for moving a carcass past a blade in a longitudinal direction for cutting the carcass;

the blade having an elongated member having opposite mounting ends adapted to be mounted to the loin puller machine;

the mounting ends being longitudinally offset with respect to one another;

a cutting edge on the member between the opposite mounting ends, and the cutting edge having opposite first and second cutting ends;

the cutting edge being longitudinally sloped between upper and lower ends so as to be adapted to cut into a meat carcass sequentially from the first cutting end to the second cutting end.

10. The machine of claim 9 wherein the blade is Z-shaped.

11. The machine of claim 10 wherein the blade has a shelf portion and a belly cut portion.

12. The machine of claim 9 wherein the blade is J-shaped.

13. The machine of claim 12 wherein the blade has a trimming portion and a radius portion.

14. The machine of claim 9 wherein the mounting ends have parallel and offset axis.

15. A method of cutting meat from a pork carcass moving on a loin pulling machine, the method comprising: gradually introducing a longitudinally sloped cutting edge of a blade into the carcass, from one end of the cutting edge to another end of the cutting edge, to prevent buckling of the meat and to achieve a clean cut of the meat.

16. The method of claim 15 wherein one end of the cutting edge enters the meat before an opposite end of the cutting edge enters the meat.

17. The method of claim 15 wherein the blade is a Z blade.

18. The method of claim 15 wherein the blade is a J blade.

19. The method of claim 15 wherein the blade is a trim blade.

* * * * *